United States Patent
Spesser

(10) Patent No.: US 10,611,266 B2
(45) Date of Patent: Apr. 7, 2020

(54) CHARGING DEVICE AND VEHICLE HAVING A PLURALITY OF CHARGING INTERFACES

(71) Applicant: Dr. Ing. h.c. F. Porsche Aktiengesellschaft, Stuttgart (DE)

(72) Inventor: Daniel Spesser, Illingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/153,965

(22) Filed: Oct. 8, 2018

(65) Prior Publication Data

US 2019/0106007 A1 Apr. 11, 2019

(30) Foreign Application Priority Data

Oct. 10, 2017 (DE) .................. 10 2017 123 457

(51) Int. Cl.
*B60L 53/66* (2019.01)
*B60L 53/31* (2019.01)
(Continued)

(52) U.S. Cl.
CPC ............ *B60L 53/665* (2019.02); *B60L 53/16* (2019.02); *B60L 53/22* (2019.02); *B60L 53/31* (2019.02)

(58) Field of Classification Search
CPC ........ B60L 53/665; B60L 53/31; B60L 53/16; B60L 53/22
See application file for complete search history.

(56) References Cited

U.S. PATENT DOCUMENTS 6,123,569 A * 9/2000 Fukushima ........ H01R 13/5825
439/456
6,707,369 B2 3/2004 Morimoto et al.
(Continued)

FOREIGN PATENT DOCUMENTS

DE 10251863 A1 5/2003
DE 102011118957 A1 5/2013
(Continued)

OTHER PUBLICATIONS

University of Maryland, "Level-3 Integrated on-board electric vehicle battery charger", 2015, University of Maryland , pp. 2-3. obtained on Oct. 23, 2019 at https://www.umventures.org/technologies/level-3-integrated-board-electric-vehicle-battery-charger (Year: 2015).*

(Continued)

*Primary Examiner* — Stacy Whitmore
(74) *Attorney, Agent, or Firm* — RatnerPrestia

(57) ABSTRACT

A charging device for a vehicle is made available, which has two multi-pole connections, each of which can be coupled to a charging interface which is arranged on the vehicle. A power electronics module which is designed to convert alternating current into direct current is coupled to the two multi-pole connections. At least one measuring device which is designed to determine a parameter of the charging current is present at a pole of one of the two multi-pole connections during a charging process. An evaluation unit is coupled to the at least one measuring device and is designed to determine, on the basis of the parameter determined by the measuring device, whether the charging process is taking place by means of the first or by means of the second multi-pole connection.

7 Claims, 2 Drawing Sheets

(51) Int. Cl.
*B60L 53/16* (2019.01)
*B60L 53/22* (2019.01)

(56) References Cited

U.S. PATENT DOCUMENTS

| | | | |
|---|---|---|---|
| 10,017,063 B2 | 7/2018 | Martens et al. | |
| 10,099,565 B2 | 10/2018 | Spesser | |
| 2012/0161797 A1* | 6/2012 | Hein | G01R 31/42 |
| | | | 324/705 |
| 2012/0206100 A1* | 8/2012 | Brown | B60L 3/0069 |
| | | | 320/109 |
| 2015/0381076 A1* | 12/2015 | Sadki | H02P 29/032 |
| | | | 363/132 |
| 2017/0210237 A1* | 7/2017 | Buehs | B60L 53/14 |
| 2018/0072169 A1* | 3/2018 | Lee | B60L 53/16 |
| 2018/0091191 A1* | 3/2018 | Berger | B60L 53/68 |
| 2018/0212373 A1* | 7/2018 | Zhang | H01R 13/7172 |
| 2019/0061539 A1* | 2/2019 | Spilger | H01R 31/065 |
| 2019/0106005 A1* | 4/2019 | Straber | B60L 53/16 |
| 2019/0152339 A1* | 5/2019 | Lowenthal | B60L 3/0046 |
| 2019/0168628 A1* | 6/2019 | Pfeilschifter | B60L 53/14 |

FOREIGN PATENT DOCUMENTS

| | | |
|---|---|---|
| DE | 102015112346 A1 | 2/2017 |
| DE | 102015112349 A1 | 2/2017 |
| JP | 2010187467 A | 8/2010 |
| JP | 2015122866 A | 7/2015 |
| JP | 2016144965 A | 8/2016 |

OTHER PUBLICATIONS

Japanese Notice of Reasons for Refusal for Japanese Application No. 2018-189872, dated Sep. 18, 2019, 4 pages. 2.
Korean Office Action for Korean Application No. 10-2018-0119520, dated Jan. 18, 2020, 5 pages.

* cited by examiner

CHARGING DEVICE AND VEHICLE HAVING A PLURALITY OF CHARGING INTERFACES

CROSS-REFERENCE TO RELATED APPLICATION

This application claims priority to German Patent Application No. DE 10 2017 123 457.8, filed Oct. 10, 2017, which is incorporated by reference herein in its entirety.

FIELD OF THE INVENTION

In vehicles which have an electric drive in addition to a conventional internal combustion engine, referred to as plug-in hybrids (also termed PHEVs (plug-in hybrid electric vehicles)), a charging socket for inserting the charging coupling is provided in a fashion analogous to the tank aperture for the refueling process. Said charging coupling is connected directly to the vehicle-side charging device (OBC—on board charger) which is responsible for converting alternating current into direct current.

BACKGROUND OF THE INVENTION

In purely electrically driven vehicles (termed BEVs (battery electric vehicles)), the charging of the drive battery assumes a greater significance. In this context situations can occur in which the vehicle is positioned for the charging at the charging station in such a way that the charging socket on the vehicle is not facing the charging column. If, for example, the charging column is arranged on one side of the parking place or a parking bay, there is a preferred parking direction (rearward or forward). If the driver does not adhere to this, because, for example, he wishes to park differently than in the way provided, the charging cable must be pulled transversely over the engine hood, in order to reach the charging socket which is then arranged on the opposite side of the vehicle. The disadvantage with the existing charging concepts is therefore the lack of flexibility of the position of the charging socket and the positioning of the charging infrastructure at the charging location of the vehicle.

SUMMARY OF THE INVENTION

Described herein is a flexible charging concept for electric vehicles with which, in particular, the awkward positioning of the charging cable over the engine hood can be avoided.

Two charging sockets (charging interfaces) are made available on the vehicle, in each case, one of which is arranged on one side of the vehicle. Correspondingly, in various exemplary embodiments a charging device for a vehicle is made available with a plurality of charging interfaces, wherein the charging device has a first multi-pole connection which can be coupled to a first charging interface which is arranged in the vehicle, a second multi-pole connection which can be coupled to a second charging interface which is arranged in the vehicle, a power electronics module which is designed to convert alternating current into direct current and has a multi-pole power connection, wherein each of the poles of the multi-pole power connection is coupled to the respective corresponding poles of the two multi-pole connections, at least one measuring device which is designed to determine a parameter of the charging current present at a pole of one of the two multi-pole connections during a charging process, and an evaluation unit which is coupled to the at least one measuring device and is designed to determine, on the basis of the parameter determined by the measuring device, whether the charging process is taking place by means of the first or by means of the second multi-pole connection.

The multi-pole connection can be the connection which is generally used nowadays for charging electric vehicles, wherein both connections for single-phase and connections for three-phase charging are possible. In the first case, a pole or contact is used for the one phase, and in the second case three poles are used for the three different phases (L1, L2, L3). In addition, one pole can serve to connect the neutral conductor (N), and a further pole can be used to connect the ground potential or the protective conductor (PE). Further poles can be used to transmit control signals. In the installed state, the first multi-pole connection can be coupled to a first charging interface, and the second multi-pole connection can be coupled to a second charging interface.

The power electronics module can essentially have one AC/DC converter. The multi-pole power connection of the power electronics module can have a number of poles (contacts), with the result that at least the usually one or three phases of the charging current, the neutral conductor and the protective conductor can be connected to the power electronics module.

The evaluation unit which is coupled to be at least one measuring device (measuring pickup) can be present in the form of a microcontroller. The evaluation unit can determine, on the basis of the parameter value (current strength or voltage) measured by the at least one measuring device, whether the charging process is taking place by means of the first or by means of the second multi-pole connection. In other words, the evaluation unit can be designed to determine to which charging interface a charging coupling is connected. On the basis of the determination as to which charging interface is being used for charging, the evaluation unit can be designed to carry out plausibility checking of the parameters which are determined by the measuring devices. By making available measuring devices (voltage meters and/or ammeters) in the charging device according to aspects of the invention it is possible, in particular, to avoid passive voltage feedback during the operation of a charging interface. The implementation of such a protective function can be carried out by means of additional changes to standards and, if appropriate, changes to standards which have occurred later. At present, there is a requirement to protect the charging socket against contact when it is not in use by locking/closing the associated charging flap. The safety level can be raised by making available measuring devices for monitoring the current flow of the individual phases.

By means of plausibility checking of the parameters measured by the measuring devices it is possible to implement, in the evaluation unit, a check algorithm which carries out plausibility checking for the detection of the charging interface during operation. The determined information can be compared with the status of the charging flap (closed/opened) of the corresponding charging interface and, when irregularities occur, as the charging process can be deactivated or activated if the plausibility checking concludes with a positive result. A charging flap is understood to be the cover in the sense of a fuel tank flap in a conventional vehicle with an internal combustion engine, which charging flap is attached to the charging socket or charging interface. The evaluation unit can be designed to compare the configuration of the measured measurement parameters with a charging scenario (e.g. charging via the charging socket or charging via the left-hand charging socket) and to check whether the configuration of the measured measurement parameters is plausible on the basis of the charging scenario.

According to further exemplary embodiments, in the charging device according to aspects of the invention the number of measuring devices can correspond to the number of phases of the charging current. It is therefore possible for a measuring device to be made available for monitoring/measuring the current of one phase in each case. If, for example, three phases (L1, L2, L3) are present in each case a measuring device can be made available for respectively monitoring one phase. A measuring device which measures/monitors the current of a phase can be arranged here either in the branch which connects a pole of the power connection to the corresponding pole of the first multi-pole connection or in the branch which connects a pole of the power connection to the corresponding pole of the second multi-pole connection. In other words, it is not necessary for a phase which starts from the first or from the second connection (for example L2) to be monitored by means of a measuring device.

According to further exemplary embodiments, in the charging device according to aspects of the invention it is possible to make available a further measuring device which is designed to determine a parameter of the current flowing through the neutral conductor of the first or of the second multi-pole connection during the charging process. The measuring device can be the same measuring device which is used to measure the phases. The parameter which is determined by the further measuring device can also be taken into account during the execution of the plausibility checking.

According to further exemplary embodiments of the charging device, the electrical connection between the multi-pole connections and the power connection can have conductive connections on a circuit board. In other words, the conductive connection can be implemented between the first and the second connections by means of a space-saving circuit board (PCB—printed circuit board), in order to transfer the energy from the charging sockets to the power electronics module. In a conventional implementation of a combination of the cabling of two charging sockets to form one connection to the AC/DC converter, a charging network distributor (CND) would be used. In this context, a total of three cables together with plugs would have been used—two of these would each connect a charging socket to the CND and one would connect the output of the CND to the AC/DC converter. The charging network distributor has a solid aluminum casing, since it is usually arranged outdoors and therefore is of a robust design. As a result it constitutes an additional source of cost. As a result of the necessary electrical connections within the CND, it is extremely large (usually approximately 30 cm×30 cm) and therefore constitutes additional weight. The use of a circuit board allows the abovementioned three cables together with a plug to be eliminated and the entire design can be made more compact. In addition such a design is more reliable, since it is no longer possible to release the plugs from the corresponding sockets. Instead of connecting the poles of the two charging interfaces by means of the CND, the latter are connected in the charging device according to aspects of the invention without using a CND. As a result, it is possible to dispense with the CND as an additional component, which constitutes a saving in terms of cost, space and weight. Since the abovementioned plug connections are therefore also eliminated, the risk of the ingress of moisture is minimized at the same time.

In further exemplary embodiments, a vehicle having an electric motor is also made available for making available drive energy, wherein the vehicle has a first charging interface, a second charging interface, and the charging device according to aspects of the invention. The vehicle can be a purely electrically driven vehicle or a vehicle with a hybrid electric drive which also additionally has a conventional internal combustion engine.

According to further exemplary embodiments, in the vehicle the first charging interface and the second charging interface can be arranged on different sides of the vehicle. The first charging interface can be arranged on the driver's side of the vehicle, and the second charging interface can be arranged on the front seat passenger's side of the vehicle. By making available two charging interfaces it is possible to make optimum use of a charging infrastructure without a preferred orientation of the vehicle when parking, with the result that in particular the charging cable does not have to be laid transversely across the vehicle in order to reach a charging interface which is located an the side of the vehicle facing away from the charging column.

According to further exemplary embodiments, the vehicle can also have a control device which is coupled to the evaluation unit and is designed to lock a charging flap of the charging interface which is not being used during a charging process. The control device can be part of the evaluation unit. Since in the case of the charging process a charging cable is only connected to one of the two charging interfaces, the charging flap can be locked at the interface which is not being used, with the result that the latter remains securely closed. The locking of the charging flap of the charging interface which is not being used can be preceded by the plausibility checking as described above, on the basis of the parameter values which are made available by the at least one measuring device. This can increase the safety when charging the electric vehicle, since during the charging process access to the charging interface which is not being used can be prevented.

BRIEF DESCRIPTION OF THE DRAWINGS

Further details, features and advantages of the invention emerge from the following description of preferred embodiments with reference to the drawings. The drawings illustrate here merely exemplary embodiments of the invention which do not restrict the essential inventive idea. The terms "coupled" or "connected" which are used within the scope of this application are to be understood with respect to electrical components as generally meaning that the corresponding electrical components are connected to one another by means of electrical connections which are selectively provided.

DETAILED DESCRIPTION OF THE INVENTION

Figure 1:
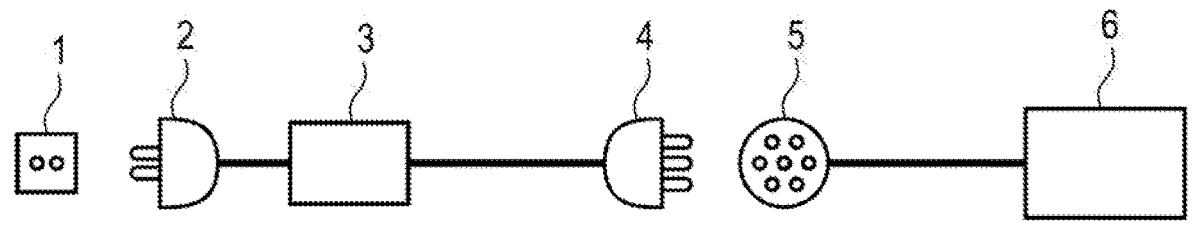
FIG. 1 shows a schematic overview of a contemporary charging infrastructure.

FIG. 1 illustrates a schematic overview of an exemplary contemporary charging infrastructure in which a charging process at a socket 1 is illustrated. However, an electric vehicle can basically be charged at various charging points such as a charging column of an electric recharging station, a domestic socket or an industrial plug connection. In the illustrated example, a suitable plug 2 of an in-cable charging device 3 (also termed IC-CPD (in-cable control and protection device)) is plugged into the socket 1. The in-cable charging device 3 assumes the control of the charging process in this configuration, wherein it detects, for example, faults and overloads. The other end of the in-cable charging device 3 is terminated with a charging coupling 4 which is plugged into the charging socket 5 (charging interface) of a vehicle. The charging socket 5 is coupled to the vehicle-side charging device 6 (OBC) which is designed to convert alternating current into direct current.

Since only one charging socket 5 is provided on the vehicle to be charged, it may be the case that the charging cable which connects the plug 2 to the charging coupling 4 has to be laid across the vehicle bodywork in order to perform the charging process. If the charging process takes place at a charging column, an in-cable charging device 3 is not used. Since charging cables used on charging columns are relatively thick or relatively inflexible, the charging process can be arduous for the vehicle driver if he is obliged to pull the charging cable transversely across the vehicle to its other side in the event of the charging socket 5 not facing the charging column.

Figure 2:
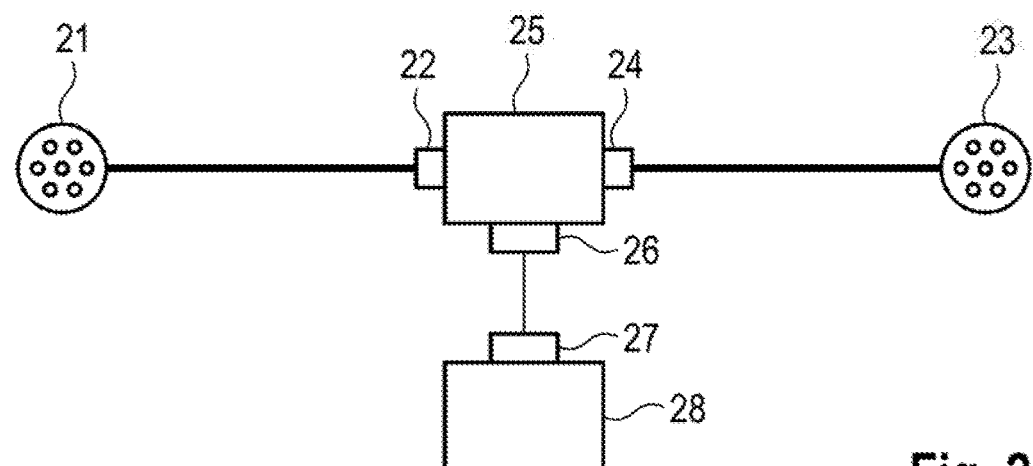
FIG. 2 shows an embodiment of the charging device for a vehicle having two charging interfaces.

FIG. 2 shows an embodiment of the charging device according to aspects of the present invention for a vehicle having two charging interfaces. A first charging interface 21 is coupled to a charging network distributor 25, wherein the cable which starts from the first charging interface 21 is terminated with a first plug 22 and is plugged into the charging network distributor 25. In an analogous fashion, a second charging interface 23 is coupled to the charging network distributor 25, wherein the cable which starts from the second charging interface 23 is terminated with a second plug 24 and is plugged into the charging network distributor 25. In this exemplary embodiment, in each case five separate poles (contacts) are indicated on the two charging interfaces 21, 23 by means of small circles, wherein each pole represents an insulated line. For example, three poles can be used for the phases (L1, L2, L3), one pole can correspond to the neutral conductor (N), and a further pole can correspond to the protective conductor (PE). Of course, more or fewer poles can also be made available, for example for additional control lines.

The charging network distributor 25 combines the cabling which starts from the charging interfaces 21, 23 and is coupled by means of a third plug 26 to a connection 27 of a vehicle-side charging device 28, which has, in particular, an AC/DC converter which corresponds to the power electronics module. As already described, the first charging interface 21 can be arranged on one side of the vehicle, for example the driver's side, and the second charging interface 23 can be arranged on the other side of the vehicle. When the inventive charging device which is shown in FIG. 2 is used, it is therefore possible for a charging process to take place via the first charging interface 21 or via the second charging interface 23, and it can therefore be adapted in a flexible way to the structural conditions of the charging infrastructure.

Figure 3:
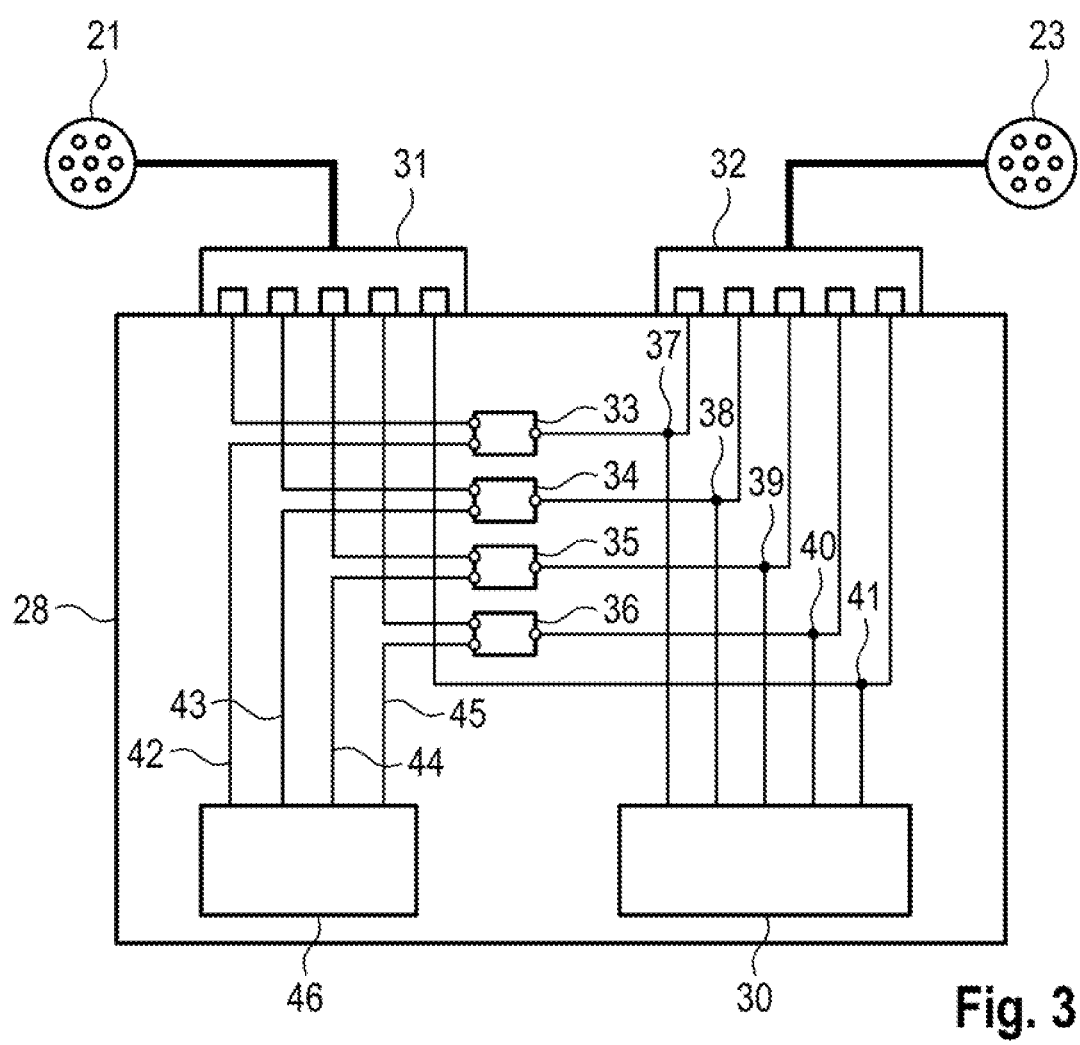
FIG. 3 shows a further embodiment of the charging device for a vehicle having two charging interfaces.

FIG. 3 shows a further embodiment of the charging device for a vehicle having two charging interfaces 21, 23. In a departure from the embodiment shown in FIG. 2, a charging network distributor 25 is not used to combine the cabling of the two charging interfaces 21, 23. In the embodiment shown in FIG. 3, the cabling which starts from the two charging interfaces 21, 23 is combined directly at the vehicle-side charging device 28. Eliminating the charging network distributor 25 also reduces the number of plug connections, making this embodiment more cost-effective, more compact and lighter in weight. The first charging interface 21 is connected to a first connection 31 of the charging device 28. A pole or a separate pin (represented by small rectangles) at the first multi-pole connection 31 of the charging device 28 corresponds to each pole or contact of the first charging interface 21. From left to right, the assignment, can correspond, for example, to L1, L2, L3, N, PE. In analogous fashion, the second charging interface 23 is also connected to a second multi-pole connection 32 of the charging device 28, wherein a pole or a separate pin (represented by small rectangles) at the second connection 33 of the charging device 28 also corresponds to each pole or contact of the second charging interface 23. From left to right the assignment of the poles at the second connection 32 can correspond to the assignment at the first connection 31. Poles of the first connection 31 and of the second connection 32 which have the same name or are of the same type are combined at corresponding nodes 37-41 (i.e. first node 37, second node 38, third node 39, fourth node 40 and fifth node 41) and led on to the power electronics 30, which have essentially the AC/DC converter.

A measuring device 33-36 is respectively made available in each line between a node 37-40 and the pole coupled thereto at the first connection 31 (i.e. first measuring device 33, second measuring device 34, third measuring device 35, fourth measuring device 36), said measuring device 33-36 being designed to determine a value of a parameter (current or voltage) of the current flowing through the associated line during the charging process. Each of the measuring devices 33-36 is respectively coupled by means of a measuring line 42-45 (i.e. first measuring line 42, second measuring line 43, third measuring line 44, fourth measuring line 45) to the evaluation unit 46. The evaluation unit 46 is designed to determine, on the basis of the parameters determined by the measuring devices 33-36, whether the charging process takes place by means of the first multi-pole connection 31, i.e. by means of the first charging interface 21, or by means of the second multi-pole connection 32, i.e. by means of the second charging interface 23. The connection between the first and second charging interfaces 21, 23 and the power electronics module 30 can be implemented by means of a circuit board. The evaluation unit 46 can have a microcontroller, with which contact is correspondingly made via conductor tracks on the circuit board.

Although with the exception of the protective conductor pole of the first connection 31 in the exemplary embodiment shown in FIG. 3 all the other four poles are monitored by means of a measuring device 33-36, this is not an absolute requirement. It therefore may suffice, for example, if just one of the three phases L1, L2, L3 is monitored, that is to say the current flowing through the corresponding line is detected or measured. In contrast to the configuration illustrated in FIG. 3, the measuring devices 33-36 do not all have to be arranged on the same side of the nodes 37-41. Of the illustrated measuring devices 33-36, at least one can be arranged on a line between a node 37-41 and the corresponding pole of the second connection 32. Likewise, the fourth measuring device 36 can be arranged between the fourth node 40 and the power electronics module 30. In addition, it is not necessary to monitor every phase of the connections and therefore some of the measuring devices 33-36 can be omitted. In principle it is sufficient to monitor just one of the phases by means of a measuring device which is made available, in order to determine whether the first or second charging interface 21, 23 is used during a charging process. However, providing a plurality of measuring devices 33-36 makes more reliable plausibility checking possible.

The evaluation unit 46 is designed to carry out a plausibility check on the basis of the measured values supplied by the measuring devices 33-36. On the basis of the configuration illustrated in FIG. 3 it is possible to check, for example, whether the determined measured values which are determined by the measuring devices 33-36 fit a charging process which takes place by means of the first charging interface 21 in that it is checked whether at least one of the measuring devices 33-35 which monitor the phases of the first connection 31 indicates a flow of current, i.e. measures a current strength which is different from zero. If none of the measuring devices 33-35 which monitor the phases of the first connection 31 indicates a flow of current, the second charging interface 23 is, in contrast, in use during a charging process which is taking place. If the evaluation unit determines that despite a charging process at the second charging interface 23 a current is flowing at one of the phases L1, L2, L3 of the first connection 31, this result is categorized as implausible, and starting of the charging process can be prevented, or a charging process which is already taking place can be interrupted.

In a further exemplary embodiment, it is possible, as indicated above, to move the fourth measuring device from its position shown in FIG. 3 between the fourth node 41 and the power electronics module 30. In such a configuration, plausibility checking can be carried out during a charging process via the second charging interface 23 in such a way that it is checked whether at least one of the three measuring devices 33-35 does not indicate a flow of current (stricter criterion: none of the three measuring devices 33-35 indicates a flow of current) and whether the fourth measuring device 36 indicates a flow of current. If such a configuration of measurement parameters is determined, it corresponds to a positive result of plausibility checking during a charging process which takes place using the second charging interface 23. This second scenario for the execution of plausibility checking by means of the evaluation unit shows just one further possible way, of many other possible ways, of carrying out the plausibility checking on the basis of a specific arrangement of the measuring devices 33-36.

If the verification of the determined measurement parameters within the scope of the plausibility checking on the basis of a charging scenario fails, the charging process can, for example, be aborted in that the evaluation unit 46 transmits a corresponding abort signal to the vehicle electronics. Successfully carried out verification of the measurement parameters within the scope of the plausibility checking can also be used as a condition for enabling of the charging process.

What is claimed is:

1. A charging device for a vehicle, having:
   a first multi-pole connection which can be coupled to a first charging interface which is arranged on the vehicle;
   a second multi-pole connection which can be coupled to a second charging interface which is arranged on the vehicle;
   a power electronics module which is configured to convert alternating current into direct current and has a multi-pole power connection, wherein each of the poles of the multi-pole power connection is coupled to the respective corresponding poles of the first and second multi-pole connections;
   at least one measuring device which is configured to determine a parameter of a charging current present at a pole of one of the first and second multi-pole connections during a charging process; and
   an evaluation unit which is coupled to the at least one measuring device and is configured to determine, on the basis of the parameter determined by the measuring device, whether the charging process is taking place by the first multi-pole connection or by the second multi-pole connection,
   wherein a number of measuring devices corresponds to a number of phases of the charging current.

2. The charging device as claimed in claim 1, further comprising a further measuring device which is configured to determine a parameter of the current flowing through a neutral conductor of the first or of the second multi-pole connection during the charging process.

3. The charging device as claimed in claim 2, wherein the at least one measuring device and the further measuring device are configured to measure a current strength or a voltage.

4. The charging device as claimed in claim 1, wherein the electrical connection between the multi-pole connections and the power connection has conductive connections on a circuit board.

5. A vehicle having an electric motor for making available drive energy, wherein the vehicle has:
   a first charging interface;
   a second charging interface; and
   a charging device as claimed in claim 1.

6. The vehicle as claimed in claim 5, wherein the first charging interface and the second charging interface are arranged on different sides of the vehicle.

7. The vehicle as claimed in claim 5, further comprising:
   a control device which is coupled to the evaluation unit and is configured to lock a charging flap of one of the charging interfaces which is not being used during a charging process.

* * * * *